United States Patent
Höing et al.

(10) Patent No.: US 8,646,923 B2
(45) Date of Patent: Feb. 11, 2014

(54) REAR VIEW MIRROR FOR A MOTOR VEHICLE AND METHOD FOR THE PRODUCTION OF A REAR VIEW MIRROR

(75) Inventors: Thomas Höing, Cham (DE); Klaus Högerl, Furth in Wald (DE)

(73) Assignee: Flabeg GmbH & Co. KG, Furth im Wald (DE)

(*) Notice: Subject to any disclaimer, the term of this patent is extended or adjusted under 35 U.S.C. 154(b) by 663 days.

(21) Appl. No.: 12/634,359

(22) Filed: Dec. 9, 2009

(65) Prior Publication Data
US 2010/0149670 A1 Jun. 17, 2010

(30) Foreign Application Priority Data
Dec. 16, 2008 (DE) .......................... 10 2008 062 101

(51) Int. Cl.
*G02B 5/10* (2006.01)
*B60R 1/08* (2006.01)
(52) U.S. Cl.
CPC ..................................... *B60R 1/081* (2013.01)
USPC ......................................................... 359/864
(58) Field of Classification Search
USPC ................... 359/866, 871, 872, 864
See application file for complete search history.

(56) References Cited

U.S. PATENT DOCUMENTS

| 4,200,359 | A | * | 4/1980 | Lawson | 359/850 |
| 4,223,983 | A | * | 9/1980 | Bloom | 359/864 |
| 4,311,363 | A | * | 1/1982 | Marsalka et al. | 359/864 |
| 6,612,708 | B2 | * | 9/2003 | Chu | 359/883 |
| 7,448,764 | B2 | * | 11/2008 | Platzer, Jr. | 359/864 |
| 7,748,856 | B2 | * | 7/2010 | Zhao | 359/868 |
| 2006/0289423 | A1 | * | 12/2006 | Martinez et al. | 219/219 |

FOREIGN PATENT DOCUMENTS

JP          55-076721      * 10/1980

* cited by examiner

*Primary Examiner* — Alessandro Amari
(74) *Attorney, Agent, or Firm* — Suzannah K. Sundby, Esq.; Smith, Gambrell & Russell, LLP

(57) ABSTRACT

A rear view mirror (1) for a motor vehicle comprising a metal-coated substrate (2) which forms a main mirror surface (4) and is provided in a subarea with an additional blind spot mirror (6) is to provide a particularly high reproduction quality of the reflected image, while production costs are kept down. For this purpose, according to the invention, the additional blind spot mirror (6) is bonded onto the side of the substrate (2) remote from the direction of light incidence on the substrate (2) by a transparent, light-resistant adhesive.

9 Claims, 4 Drawing Sheets

REAR VIEW MIRROR FOR A MOTOR VEHICLE AND METHOD FOR THE PRODUCTION OF A REAR VIEW MIRROR

The invention relates to a rear view mirror for a motor vehicle comprising a metal-coated substrate which forms a main mirror surface and is provided in a subarea with an additional blind spot mirror. It also relates to a method for the production of a rear view mirror of this type.

Simple rear view mirrors for motor vehicles, in particular wing mirrors which are mounted on the outside of the motor vehicle, usually have a spatial area in which the driver has no visibility, the so-called blind spot, which is attributable to shape and type of construction. In order to limit or completely avoid the risk of accidents which may be caused by this blind spot, the rear view mirrors for a motor vehicle, in particular when intended to be used as wing mirrors, can therefore be provided with additional components to make the blind spot visible to the driver. For this purpose, the entire rear view mirror can be configured as an aspherical curved mirror to thereby increase the field of vision. However, the proportion and contour accuracy of the mirror is limited and perception of details is restricted. Moreover, aspherical curved mirrors are presently prohibited in the USA, for example.

Alternatively, the rear view mirror can substantially have a main mirror surface which is formed by a metal-coated substrate and is provided in a subarea with an additional element for the blind spot. This additional element can be configured as an aspherical region of the mirror surface such that vision is possible in the blind spot. However, a configuration of this type is unsatisfactory in respect of aesthetics and simple cleaning ability. In particular, it causes distortions in viewing which can impede, or even completely prevent, the driver's image perception. Alternatively, to detect the blind spot, a piano-cylindrical mirror can be provided in the subarea which does give visibility in the blind spot, but changes the proportions in the reproduced image. On the other hand, it is possible to grind a curved contour or calotte into the back of the metal-coated substrate forming the main mirror surface in the subarea provided for the additional blind spot mirror, in which case comparatively good results are achieved in respect of image reproduction. However, this concept requires a relatively complex and thus cost-intensive production process and is therefore only suitable to a limited extent in particular for industrial-scale manufacture.

The object of the invention is therefore to provide a rear view mirror for a motor vehicle of the type mentioned above which allows particularly high reproduction quality of the reflected image, while keeping production costs down. A method which is particularly suitable for the production of the rear view mirror is also provided.

With regard to the rear view mirror, this object is achieved according to the invention in that the additional blind spot mirror is bonded onto the side of the substrate, remote from the direction of incident light on the substrate, by a transparent, light-resistant adhesive.

In this respect, the invention is based on the idea that, for high-quality image reproduction and thus particularly high operational reliability when using a rear view mirror, favourable results can be achieved from the use of curved additional contours, which are provided in the supplementary surface of the main mirror. However, in order to keep production costs and associated costs down to a particularly low level, in particular with regard to possible suitability for industrial-scale manufacture, processing methods, such as milling and etching which are required for example when calottes or the like are introduced into the main mirror surface, should consequently not be used. As has now surprisingly been found, while observing these criteria, it is also possible to achieve reproduction results of a particularly high quality by independently prefabricating the additional blind spot mirror as an additional component and then bonding it to the main surface of the mirror using a suitable transparent and light-permeable adhesive.

By using two substantially independent starting components which are subsequently joined together in a suitable manner by the adhesive, additional degrees of freedom or parameters are provided which allow an individualised adaptation of the mirror system to specific requirements, for example as a function of the intended construction method of the motor vehicle or the like. In particular, it is possible to pre-adjust and fix the field of vision which can be covered by the additional blind spot mirror, in relation to the field of vision of the main mirror surface by suitable positioning of the additional blind spot mirror in relation to the main mirror surface, particularly by tilting the additional blind spot mirror in an appropriate manner relative to the main mirror surface. To allow such an orientation, as required, of the additional blind spot mirror relative to the main mirror surface, in an advantageous embodiment, a number of spacers are positioned between the metal-coated substrate and the additional blind spot mirror. It is possible to achieve a permanent, stable positioning of the components relative to one another in a comparatively simple manner by a suitable choice of these spacers and their geometric parameters, such as thickness, inclination of the locating surfaces and the like.

The metal-coated substrate provided to form the main mirror surface is substantially configured within conventional geometric parameters for motor vehicle mirrors, i.e. in particular it is substantially planar or is configured as a calotte with a comparatively large radius of curvature of more than 1000 mm. To ensure that the blind spot area is reliably detected by the additional blind spot mirror, in a further advantageous embodiment the additional blind spot mirror, configured as a metal-coated calotte, has a smaller radius of curvature than the metal-coated substrate, preferably a radius of curvature of less than 1000 mm. It is precisely by observing these geometric parameters that the entire rear view mirror, even when the two mentioned main components are used, is only slightly wider than conventional mirrors, such that it is possible to substantially draw on standard components and standard methods in respect of incorporating the surrounding components. To facilitate this even further, the additional blind spot mirror, formed as a metal-coated calotte, is advantageously configured from relatively thin glass which preferably has an average thickness of 1.6 mm at the most. Furthermore, on account of the relatively pronounced curvature of the blind spot calotte compared to the mirror substrate, these components can be bonded together without bubbles in a particularly simple manner, so that it is possible to greatly suppress any impairment to the reproduction quality in the field of vision by the use of adhesives.

A particularly advantageous design, particularly in view of protecting the reflector layer from damage by external influences and the like, can be achieved in that the substrate is expediently metal-coated on its side remote from the direction of light incidence (known as the "position 2" design) and the additional blind spot mirror is metal-coated on its side facing the direction of light incidence (known as the "position 1" design).

In principle, any transparent, light-resistant adhesive can be used as the adhesive. However, a silicone, an acrylate, an epoxide, a urethane or a mixture of these materials is particularly advantageous as the adhesive.

In respect of conventional modern mirror concepts, the rear view mirror is advantageously configured such that it can be heated, in particular to impede or prevent it from misting up. For this purpose, the back of the metal-coated substrate of the rear view mirror forming the main mirror surface is advantageously bonded with a heating foil. In a further advantageous embodiment, this heating foil has slots in the region of the additional blind spot I mirror, such that a straightforward bonding is also possible in the region of the additional blind spot mirror.

The object is achieved in respect of the method in that a subarea of a substrate provided to form the main mirror surface is provided with a mask and is then metal-coated by applying a reflector material while leaving the partial area free, an additional blind spot mirror being bonded onto the partial area after the mask has been removed.

The particular advantages provided by the invention are that, as a result of bonding the additional blind spot mirror onto the metal-coated substrate which forms the main mirror surface, a particularly high reproduction quality can also be provided for the spatial area of the blind spot for the rear view mirror using particularly simple means and while keeping the production costs at a particularly low level. In so doing, the rear view mirror is still particularly simple overall and, during production, it is unnecessary to revert to particularly complex processing or treatment steps, such as grinding or the like, as would be necessary, for example, for additional lenses, prisms or incorporated spheres. Furthermore, it is also unnecessary to resort to plastics material components, consisting for example of PMMA or the like which, in any case, are problematic in external applications due to poor coatability, differing expansion coefficients for glass and limited service life and dimensional stability when water is absorbed. Instead, in the present case, a high reproduction accuracy is possible even when using components which are kept relatively simple, in particular glass-based components (especially the additional blind spot mirror and metal-coated substrate) which are merely supplemented by light-resistant adhesive. Moreover, the adhesive also functions as a splinter protection for the subarea concerned, so that in this sense, the general safety of the system is further enhanced.

An embodiment of the invention will be described in detail with reference to the drawings, in which.

Identical parts in all the figures have been given identical reference numerals.

Figure 1:
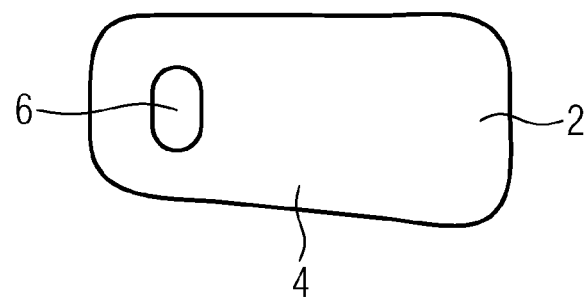
FIG. 1 is a front view of a rear view mirror.

The rear view mirror 1 according to FIG. 1 is provided for use as a wing mirror of a motor vehicle. It substantially comprises a main mirror surface 4 which is formed by a metal-coated substrate 2 and is to give the driver of the motor vehicle information about the rear spatial area located outside his field of vision. The main mirror surface 4 is substantially planar in respect of current size and proportionality requirements. This is the cause of the existence of a spatial area in which the driver has no visibility, the so-called blind spot.

To increase the safety level which can be achieved and to keep the risk of accidents, caused by the blind spot, at a particularly low level, the rear view mirror 1 is provided in a subarea of the metal-coated substrate 2 with an additional blind spot mirror 6 which is configured as a convex mirror and is to ensure visibility in the blind spot for the driver.

Figure 2:
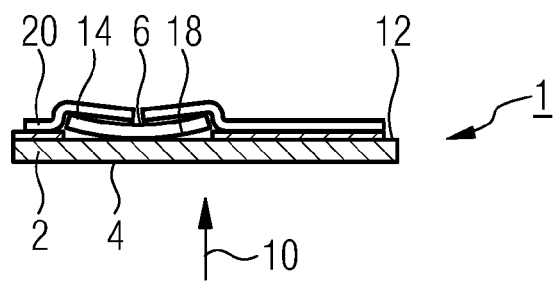
FIG. 2 is a cross-sectional view of a rear view mirror according to FIG. 1, FIGS. 3 to 7 show the substrate of the rear view mirror according to FIG. 1 in different phases of the mirror production, and FIGS. 8 to 11 each show a heating foil to be applied to the substrate of the rear view mirror.

As can be seen from the cross-sectional view in FIG. 2, the mirror substrate 2 forming the main mirror surface 4 is configured as a "position 2" mirror and, for material protection reasons, is coated on its rear side, remote from the direction of light incidence symbolised by arrow 10, with a reflector layer 12 consisting of a suitably selected reflector material, preferably chrome. The subarea provided for applying the additional blind spot mirror 6 is excluded from the otherwise substantially continuous reflector layer 12. Using an adhesive layer 14, the additional blind spot mirror 6 is bonded onto the back of the substrate 2 in this subarea, i.e. likewise on the side remote from the direction of light incidence.

In this respect, the additional blind spot mirror 6 is configured as a convex mirror and is produced using a calotte which, compared to the substrate 2, has a significantly smaller radius of curvature of less than 1000 mm. The additional blind spot mirror 6 is further configured as a "position 1" mirror and is coated on its side facing the direction of light incidence with a reflector layer 18 consisting of a suitably selected reflector material, likewise chrome in the embodiment. Provided as adhesive for joining the additional blind spot mirror 6 to the substrate 2 is a silicone adhesive or an acrylate-based adhesive which should be curable in particular for high precision processibility in UV light. The mirror system formed by the metal-coated substrate 2 and the additional blind spot mirror 6 are bonded on the back with a heating foil 20 which has slots in the region of the additional blind spot mirror 6.

Figure 3:
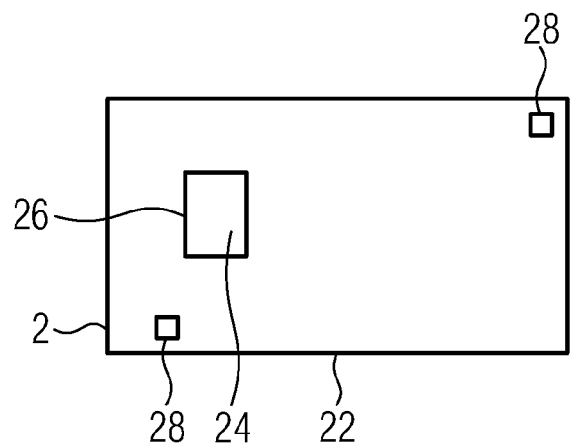

During production of the rear view mirror 1, as can be seen in FIG. 3, first of all a calotte 22 which is suitably selected to form the metal-coated substrate 2 and which has a surface area of, for example, 150×220 mm$^2$ is bonded with a protective foil provided to form a mask 24. Using this protective foil, a contour 26 for marking the intended subarea and contours 28 for reference markings are initially cut out, for example by laser treatment.

Figure 4:
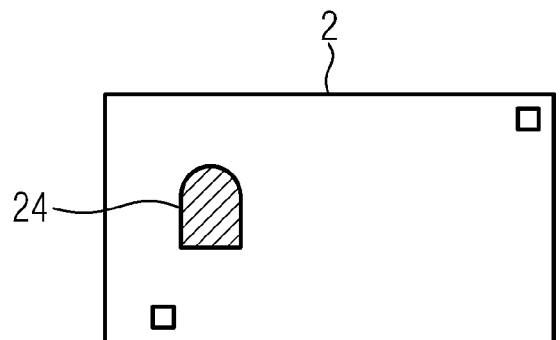

The protective foil pretreated in this manner is then removed, with remnants of foil remaining on the calotte 22 in the region of the reference markings and in the subarea for the additional blind spot mirror 6, and forming the mask 24, as shown in FIG. 4. In this state, the calotte 22 is coated with suitable reflector material, chrome in the embodiment, to form the reflector layer 12. When the coating operation is complete, the remnants of protective foil which still remain are removed so that the subarea provided for fitting the additional blind spot mirror 6 and also the regions of the reference markings remain uncoated.

Figure 5A:
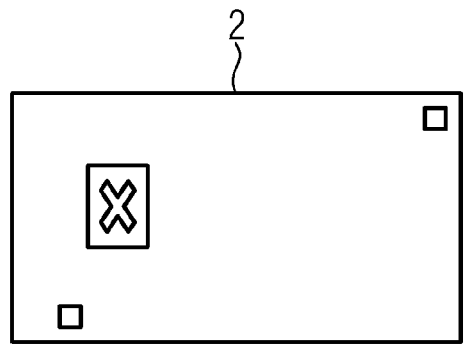
Figure 5B:
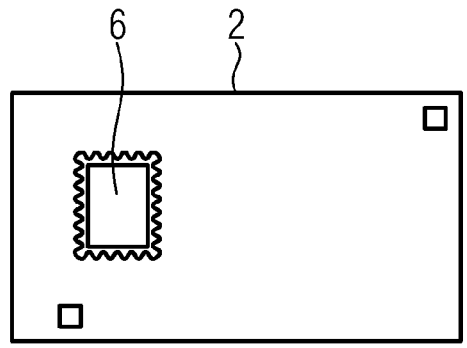
Figure 6:
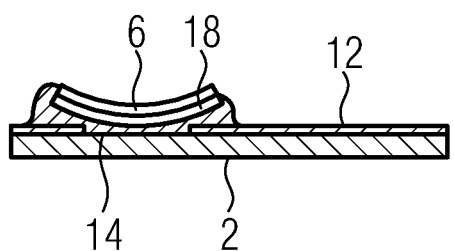

As shown in FIG. 5, the uncoated subarea of the calotte 22 is then provided with the selected adhesive, in the embodiment the acrylate-based adhesive marketed under the name "Photobond 4494" by DELO (FIG. 5*a*), and the suitably prepared additional blind spot mirror 6 which has been cut out of a calotte and has also been coated with reflector material is bonded with and pressed onto the subarea (FIG. 5*b*). As can be seen in the cross-sectional view of FIG. 6, the assembly thus obtained is then subjected to a curing step by UV light radiation, the transparent, light-permeable adhesive curing in a suitable manner. The UV light radiation can be performed on the back of the assembly or through the substrate 2.

Figure 7:
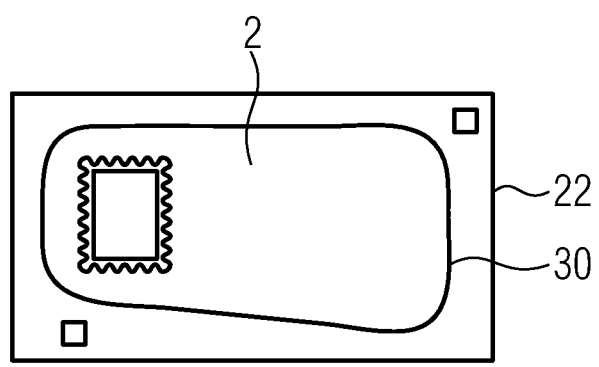

As shown in FIG. 7, the mirror contour 30 is then cut out of the calotte 22, for example by suitable cutting methods, such as laser cutting, using the reference markings which have been made. The heating foil 20 shown in FIGS. 8 to 11 in different embodiments in each case is then bonded onto the resulting contoured substrate 2, the slots 32 in the heating foil 20 being suitably positioned in relation to the subarea in which the additional blind spot mirror 6 is fitted.

Figure 8:
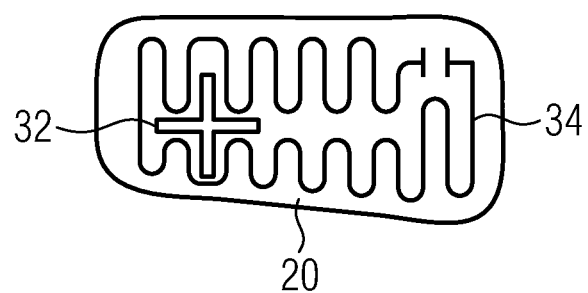
Figure 9:
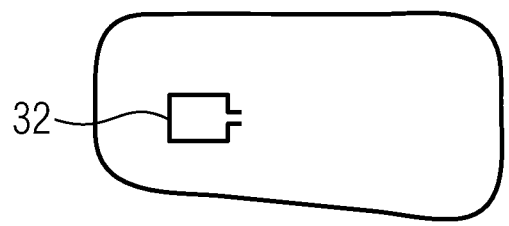
Figure 10:
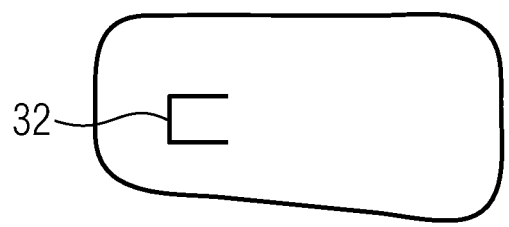
Figure 11:
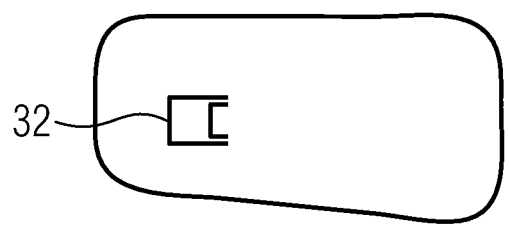

As shown only in FIG. 8, but also provided in principle in the embodiments according to FIGS. 9 to 11, the heating foil 20 comprises a respective integrated heating wire 34 which can be actuated electrically. In the individual variants, the slots 32 are made such that it is also possible to apply the heating foil 20 in a substantially undisturbed manner to the substrate 2 in the region of the additional blind spot mirror 6, in particular the contour of the respective slot 32 being suitably selected in respect of the contour of the additional blind spot mirror 6.

LIST OF REFERENCE NUMERALS

1 rear view mirror
2 metal-coated substrate
4 main mirror surface
6 additional blind spot mirror
10 arrow
12 reflector layer
14 adhesive layer
18 reflector layer
20 heating foil
22 calotte
24 mask
26 marking contour
28 reference marking contour
30 mirror contour
32 slots

The invention claimed is:

1. A rear view mirror for a motor vehicle comprising
a metal-coated substrate which forms a main mirror surface and is provided in a subarea with an additional blind spot mirror, the additional blind spot mirror being bonded onto the side of the substrate opposite from the direction of light incidence on the substrate by a transparent, light-resistant adhesive, wherein
the substrate is metal-coated on its side opposite from the direction of light incidence and the additional blind spot mirror is metal-coated on its side facing the direction of light incidence.

2. The rear view mirror according to claim 1, wherein a number of spacers are arranged between the metal-coated substrate and the additional blind spot mirror.

3. The rear view mirror according to claim 1, wherein the additional blind spot mirror is produced from a metal-coated calotte which, compared to the metal-coated substrate, has a smaller radius of curvature.

4. The rear view mirror according to claim 3, wherein the smaller radius of curvature is less than 1000 mm.

5. The rear view mirror according to claim 1, wherein the additional blind spot mirror has an average thickness of 1.6 mm at the most.

6. The rear view mirror according to claim 1, wherein a silicone or an acrylate is provided as adhesive.

7. The rear view mirror according to claim 1, the back of which is bonded with a heating foil.

8. The rear view mirror according to claim 7, the heating foil of which has slots in the region of the additional blind spot mirror.

9. A method for producing a rear view mirror according to claim 1, wherein a substrate provided to form the main mirror surface is provided with a mask in a subarea and is then metal-coated by applying a reflector material, leaving the subarea free, and wherein an additional blind spot mirror is bonded onto the subarea after the mask has been removed.

* * * * *